May 29, 1962     G. A. ROSCELLI     3,036,936
STARCH PRODUCT
Filed Jan. 14, 1960
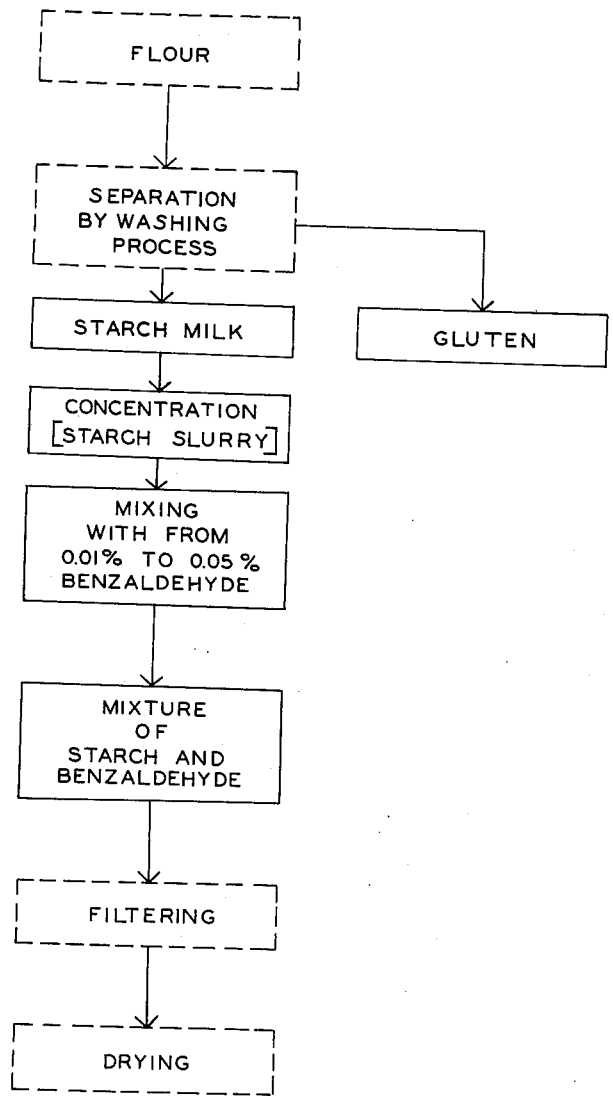
INVENTOR.
GERTRUDE A. ROSCELLI
BY
Jerome R. Cox
ATTORNEY 3,036,936
STARCH PRODUCT
Gertrude A. Roscelli, Columbus, Ohio, assignor to National Industrial Products Company, Columbus, Ohio
Filed Jan. 14, 1960, Ser. No. 2,426
8 Claims. (Cl. 127—71)

The invention disclosed and claimed in this application relates to starch and to processes of treating starch, and is illustrated by embodiments consisting of starches suitable for use as foods which are free from thermophilic bacteria and which have high viscosities and of processes for forming such starches.

In the production of starch for food it is necessary that harmful bacteria be eliminated, and it is highly desirable that a high viscosity be maintained.

In the process of the separation of starch from gluten and the purification of starch, various chemicals have heretofore been used. Some of these have been effective bactericides but many are not. Many of the chemicals heretofore used have an adverse effect upon viscosity, and all of the prior art chemicals which have been used in the treatment of starch and which are effective as bactericides, so far as I am aware, have such an adverse effect on viscosity.

One of the objects of my invention therefore is the production of a thermophilic bacteria-free unmodified starch having a thick cooked paste viscosity.

A further object of my invention is the provision of a process of producing a thermophilic bacteria-free starch having a thick cooked paste viscosity.

Other features and objects of my invention will be apparent from the following specification and claims.

The drawing hereof is a flow sheet illustrating a process of producing such a bacteria-free high vicosity starch according to one embodiment of my invention.

I have made an extensive investigation of the chemicals heretofore used in the treatment of starch. Of these prior art chamicals, many reduce or otherwise destroy the capability of starches to maintain a high viscosity. Others are of such nature that their presence in foods is harmful. Some of the prior art chemicals have capabilities of destroying thermophilic bacteria, but I have not found any in my investigations which (1) is capable of destroying thermophilic bacteria, (2) does not have a harmful effect on the sustained viscosity of the starch, and (3) is not an ingredient which is harmful in foods. I have also made an extensive investigation of other chemicals which might be capable of destroying such thermophilic bacteria. Of these, I have only found one (1) which is capable of destroying thermophilic bacteria, (2) does not have a harmful effect on the sustained viscosity of the starch, and (3) is not a harmful ingredient for food.

I have found that the addition of from 0.01% to 0.05 of benzaldehyde to the starch based on the dry weight of starch effectively destroys the harmful effect of all thermophilic bacteria which may be in the starch or which might otherwise thereafter be formed in the starch. The presence of this amount of benzaldehyde does not reduce the viscosity of the starch, and there is some evidence to indicate that the presence of the benzaldehyde aids in the stabilizing of a high viscosity. Benzaldehyde is not harmful as an ingredient of food and, as will be hereinafter pointed out, its use in foods is specifically sanctioned by the Food and Drug Administration of the U.S. Department of Health, Education and Welfare.

The "product of mixing starch with benzaldehyde" referred to hereinafter in this specification and in the claims may be a reaction product or it may be merely a mixture of the two compounds. I am not sure whether there is any reaction between the two compounds or not although I have no actual evidence of such a reaction. However, by the use of the phrase "product of mixing starch with benzaldehyde" I intend to embrace such product whether it is a reaction product, merely a mixture, or partly reacted and partly a mixture.

Benzaldehyde is available in two forms—either the refined natural product or the synthetic product. The refined natural product is sold as "bitter almond oil (free from prussic acid)." Bitter almond oil is an essential oil from the seeds of Prunus amygdala amara. Its chief constituents are benzaldehyde (about 95–96%), hydrocyanic acid (prussic acid) and a minor proportion of a third compound which may be a reaction product of benzaldehyde and prussic acid such as mendelonitrile or benzaldehyde cyanohydrin. This third product is apparently removed with the removal of the prussic acid. Thus bitter almond oil (free from prussic acid) or (S.A.P.—sans acidium prussicum) is essetnially pure benzaldehyde. In this specification and in the claims thereof, by the term benzaldehyde I mean either natural benzaldehyde (i.e. refined bitter almond oil free of prussic acid) or synthetic benzaldehyde (i.e. "artificial bitter almond oil").

In a proposed *rule* published by the Food and Drug Administration in The Federal Register for April 21, 1959, on page 3055, the substance "bitter almond (free from prussic acid)" is listed as an essential oil in a listing of "substances that are generally recognized as safe" within the meaning of Section 409 of the Federal Food, Drug, and Cosmetic Act.

In the drawing I have illustrated a preferred process which is an embodiment of my invention. Therein a starch milk (approximately 5% starch solids) after being separated from flour by a washing process, and usually concentrated to 33 to 37% starch solids, is mixed with about 0.03% benzaldehyde and then the starch is filtered and dried. This is my preferred process for an unmodified thick boiling starch. The amount of benzaldehyde may vary from 0.01% to 0.05% and in that range good results are obtained. The benzaldehyde may be added later in the process. Thus it could be added (e.g. sprayed on) to the filter cake before drying. The starch could obviously be separated by other processes. However, best results are obtained (so far as the obtaining of a thick paste cooked viscosity starch are concerned) where no sulfur dioxide ($SO_2$) is used in the process.

I prefer to add citric acid together with a buffer such as sodium citrate to obtain an extra thick boiling starch but it is to be understood that my invention is not limited to the presence or absence of sulfur dioxide or to the presence or absence of citric acid or a buffer therefor. Neither are the concentration or drying steps in that order essential to my invention although drying is necessary where I use citric acid.

For the unreacted unmodified starch, the temperature is not important so long as it stays below 125° F. Slurry temperature of 100° to 114° F. is preferred only as an aid to filtering the starch prior to drying. The pH is important only as an assurance that the starch slurry has not been affected by prior treatment (such as $SO_2$ treatment) which might affect the latent viscosity potential of the starch.

The temperatures of from 117° F. to 122° F. are very important in the obtaining of a reacted product with citric acid and might even be considered critical for such reaction inasmuch as at higher temperatures the starch granules swell and at lower temperatures, the desired effect is delayed. The Baumé of the slurry should be at about 20 and the pH at about 6 to 7. However, I prefer later to adjust the pH to about 5.5.

In the practice of the process of embodiments of my invention:

Example I

I obtained a concentrated starch slurry by separating the starch from gluten components of a high grade flour in washing troughs. The starch milk having a pH of 6 to 7 was pumped through lines free of $SO_2$ gas over a series of filters, for further cleaning, and through centrifuges where the starch milk was concentrated to 19 to 21° Bé. (33 to 37% solids). The concentrated starch was passed through a heat exchanger until the starch attained a temperature of at least 117° F. and collected in a tank for treatment. I started the agitator and added 0.03% (based on dry weight of starch) benzaldehyde. I then dry blended 0.5% of citric acid and 1% sodium citrate based on the dry weight of starch and added this to the starch-benzaldehyde slurry. The pH dropped to about 4.5. I then adjusted the pH to about 5.5 by addition of sodium carbonate. I recirculated the slurry through a heat exchanger to maintain the temperature of the slurry in the tank at least 117° F. and not more than 122° F. The slurry was held between these temperatures for 4 hours. The starch was free of thermophilic bacteria. I checked the slurry viscosity by the Keever modified Scott viscosity test (explained below) and found it equivalent to 45 seconds for a 7-ounce/gallon starch having 12% moisture. The starch was then filtered and dried and showed a Keever Scott viscosity of 48 seconds for a 6-oz./gal. starch having 12% moisture. On the evidence of the change in Scott viscosity as well as infra red analysis, I inferred that there was a reaction between the citric acid and the starch which presumably occurs upon removal of water from the starch during the filtering and drying processes.

Example II

I obtained a concentrated starch slurry by separating the starch and gluten components of a high grade flour in washing troughs. The starch milk having a pH of 6 to 7 was pumped through lines free of $SO_2$ gas over a series of filters, for further cleaning, and through centrifuges where the starch milk was concentrated to 19 to 21° Bé. (33 to 37% solids). The concentrated starch was passed through a heat exchanger until the starch attained a temperature of at least 117° F. and collected in a tank for treatment. I started the agitator and added 0.01% (based on dry weight of starch) benzaldehyde. I then dry blended 0.5% of citric acid and 1% sodium citrate based on the dry weight of starch and added this to the starch-benzaldehyde slurry. The pH dropped to about 4.5. I then adjusted the pH to about 5.5 by addition of sodium carbonate. I recirculated the slurry through a heat exchanger to maintain the temperature of the slurry in the tank at least 117° F. and not more than 122° F. The slurry was held between these temperatures for 5 hours. The starch was free of thermophilic bacteria. I checked the slurry viscosity by the Keever modified Scott viscosity test (explained below) and found it equivalent to 45 seconds for a 7 ounce/gallon starch having 12% moisture. The starch was then filtered and dried and showed a Keever Scott viscosity of 48 seconds for a 6-oz./gallon starch having 12% moisture. On the evidence of the change in Scott viscosity as well as infra red analysis, I inferred that there was a reaction between the citric acid and the starch which presumably occurs upon removal of water from the starch during the filtering and drying processes.

Example III

I obtained a concentrated starch slurry by separating the starch and gluten components of a high grade flour in washing troughs. The starch milk having a pH of 6 to 7 was pumped through lines free of $SO_2$ gas over a series of filters, for further cleaning, and through centrifuges where the starch milk was concentrated to 19 to 21° Bé. (33 to 37% solids). The concentrated starch was passed through a heat exchanger until the starch attained a temperature of at least 117° F. and collected in a tank for treatment. I started the agitator and added 0.05% (based on dry weight of starch) benzaldehyde. I then dry blended 0.5% of citric acid and 1% sodium citrate based on the dry weight of starch and added this to the starch-benzaldehyde slurry. The pH dropped to about 4.5. I then adjusted the pH to about 5.5 by addition of sodium carbonate. I recirculated the slurry through a heat exchanger to maintain the temperature of the slurry in the tank at least 117° F. and not more than 122° F. The slurry was held between these temperatures for 3 hours. The starch was free of thermophilic bacteria. I checked the slurry viscosity by the Keever modified Scott viscosity test (explained below) and found it equivalent to 45 seconds for a 7-ounce/gallon starch having 12% moisture. The starch was then filtered and dried and showed a Keever Scott viscosity of 48 seconds for a 6-oz./gallon starch having 12% moisture. On the evidence of the change in Scott viscosity as well as infra red analysis, I inferred that there was a reaction between the citric acid and the starch which presumably occurs upon removal of water from the starch during the filtering and drying processes.

Example IV

I obtained a concentrated starch slurry by separating the starch and gluten components of a high grade flour in washing troughs. The starch milk having a pH of 6 to 7 was pumped through lines free of $SO_2$ gas over a series of filters, for further cleaning, and through centrifuges where the starch milk was concentrated to 19 to 21° Bé. (33 to 37% solids). The concentrated starch was passed through a heat exchanger until the starch attained a temperature of at least 117° F. and collected in a tank for treatment. I started the agitator and added 0.03% (based on dry weight of starch) benzaldehyde. I then dry blended 0.5% of citric acid and 1% sodium benzoate based on the dry weight of starch and added this to the starch-benzaldehyde slurry. The pH dropped to about 4.5. I then adjusted the pH to about 5.5 by addition of sodium carbonate. I recirculated the slurry through a heat exchanger to maintain the temperature of the slurry in the tank at least 117° F. and not more than 122° F. The slurry was held between these temperatures for 4 hours. The starch was free of thermophilic bacteria. I checked the slurry viscosity by the Keever modified Scott viscosity test (explained below) and found it equivalent to 45 seconds for a 7-ounce/gallon starch having 12% moisture. The starch was then filtered and dried and showed a Keever Scott viscosity of 48 seconds for a 6-oz./gallon starch having 12% moisture. On the evidence of the change in Scott viscosity as well as infra red analysis, I inferred that there was a reaction between the citric acid and the starch which presumably occurs upon removal of water from the starch during the filtering and drying processes.

Example V

A starch slurry free of $SO_2$ having a pH of 6 to 7 and a Baumé of approximately 20 was treated with 0.3% benzaldehyde (based on dry weight of starch) at room temperature and then filtered and dried. The viscosity of starch was 48 seconds at 6.5 oz./gal. as opposed to the normal production starch using $SO_2$ which is 45 seconds for 7-oz./gal. A normal production starch without $SO_2$ is also 45 seconds for 6.5 oz./gal. The benzaldehyde-starch mixture was thermophilic bacteria-free while the normal production starches with and without $SO_2$ were not.

Example VI

A starch slurry free of $SO_2$ having a pH of 6 to 7 and a Baumé of approximately 20 was treated with 0.02% benzaldehyde (based on dry weight of starch) at room temperature and then filtered and dried. The viscosity of starch was 48 seconds at 6.5 oz./gal. The benzaldehyde-starch mixture was thermophilic bacteria-free.

*Example VII*

A starch slurry free of $SO_2$ having a pH of 6 to 7 and a Baumé of approximately 20 was treated with 0.01% benzaldehyde (based on dry weight of starch) at room temperature and then filtered and dried. The viscosity of starch was 48 seconds at 6.5 oz./gal. The benzaldehyde-starch mixture was thermophilic bacteria-free.

*Example VIII*

A starch slurry free of $SO_2$ having a pH of 6 to 7 and a Baumé of approximately 20 was treated with 0.05% benzaldehyde (based on dry weight of starch) at room temperature and then filtered and dried. The viscosity of starch was 48 seconds at 6.5 oz./gal. The benzaldehyde-starch mixture was thermophilic bacteria-free.

*Example IX*

A starch slurry free of $SO_2$ having a pH of 6 to 7 and a Baumé of approximately 20 was filtered and dried. Prior to drying 0.03% benzaldehyde (based on the dry weight of the starch) was added to the filter cake. The viscosity of starch was 48 seconds at 6.5 oz./gal. The benzaldehyde-starch mixture was thermophilic bacteria-free.

*Example X*

A starch slurry free of $SO_2$ having a pH of 6 to 7 and a Baumé of approximately 20 was treated with 0.03% benzaldehyde (based on dry weight of starch) and then held at temperatures of from 90° F. to 114° F. for 10 hours, and then filtered and dried. The viscosity of starch was 45 seconds at 6.5 oz./gal. as opposed to the normal production starch using $SO_2$ which is 45 seconds for 7-oz./gal. A normal production starch without $SO_2$ is also 45 seconds for 6.5 oz./gal. The benzaldehyde-starch mixture was thermophilic bacteria-free while the normal production starches with and without $SO_2$ were not.

*Examples XI to XXVI*

I prepared starch using the same procedures as Example VI with the following variations in slurry, temperatures, and percentage of benzaldehyde added.

|        | 0.03%    | .02%     | 0.01%     | 0.05%     |
|--------|----------|----------|-----------|-----------|
| 90° F  | Ex. XI   | Ex. XII  | Ex. XIII  | Ex. XIV   |
| 100° F | Ex. XV   | Ex. XVI  | Ex. XVII  | Ex. XVIII |
| 110° F | Ex. XIX  | Ex. XX   | Ex. XXI   | Ex. XXII  |
| 114° F | Ex. XXIII| Ex. XXIV | Ex. XXV   | Ex. XXVI  |

The viscosity of the resulting starch ranged from 45 seconds at 6.5 oz./gal. to 48 seconds at 6.5 oz./gal. The benzaldehyde-starch mixture was thermophilic bacteria-free.

The citric acid-sodium citrate method described above is a method which I have invented for insuring the maintenance of a high viscosity throughout the life of the starch. However my invention of the benzaldehyde starch and the process of making the benzaldehyde starch is independent of the method of increasing the viscosity of the starch and can be used with my citric acid sodium citrate method or with any other method of increasing or maintaining a high viscosity starch.

Starch treated with benzaldehyde in the proportions specified above is entirely free of thermophilic bacteria and remains free thereof throughout any reasonable handling time.

The Keever Scott viscosity test is a test for measuring the viscosity of starch. The starch to be tested is concentrated or diluted to create a desired concentration which will (after being cooked by being quickly heated under 20 lbs. steam and then held at the boiling point under 0.50 lb. steam for 20 minutes) pass through a Scott viscosity meter orifice at the rate of 100 cc. in about 45 seconds. The number of ounces of starch to the gallon of water at the time of the test gives the viscosity or fluidity of the starch. Thus a 6-oz. starch has a high viscosity, a 7-oz. starch a lower viscosity and an 18-oz. starch a very low viscosity.

It is to be understood that the above described embodiments of my invention are for the purpose of illustration only and various changes may be made without departing from the spirit and scope of my invention.

I claim:

1. A process of stabilizing starch with regard to viscosity which consists of mixing about 0.03% of benzaldehyde with the starch, during the manufacturing process in which the starch is separated from flour, concentrated, and dried.

2. A process of stabilizing starch with regard to viscosity which consists of mixing with the starch, during the manufacturing process in which the starch is separated from flour, concentrated, and dried, about 0.03% of benzaldehyde while maintaining the pH of the starch and the resulting mixture at all times at least as high as 4.5 and no higher than the normal pH of untreated starch.

3. A composition of matter consisting of a mixture of starch with approximately 0.03% benzaldehyde based on the dry weight of the starch.

4. A composition of matter consisting of the product of mixing together starch and approximately 0.03% benzaldehyde based on the dry weight of the starch.

5. A composition of matter consisting of a mixture of starch with from 0.01% to 0.05% benzaldehyde based on the dry weight of the starch.

6. A composition of matter consisting of the product of mixing starch with benzaldehyde at a temperature of from 114° F. to 117° F.

7. A composition of matter consisting of the product of mixing starch with benzaldehyde in proportions of approximately 100 parts starch and 0.03 parts of benzaldehyde.

8. A composition of matter consisting of the product of mixing starch with oil of bitter almond which is free of prussic acid in proportions of about 100 parts starch and 0.03 parts of oil of bitter almond.

References Cited in the file of this patent

UNITED STATES PATENTS 2,430,674    Hampel _____ Nov. 11, 1947

OTHER REFERENCES

Chemistry and Industry of Starch, by Kerr, Academic Press, Inc., New York, N.Y., 1950, pp. 71–76, 546–548.
Merck Index, 6th ed., 1952, pp. 123 and 128.
A Catalogue of Insecticides and Fungicides, by Frear, 1948, vol. I, p. 98, vol. II, p. 37.